Patented Dec. 6, 1938

2,139,142

UNITED STATES PATENT OFFICE 2,139,142

PURIFICATION OF MATERIALS CONTAINING NITRITE

Charles Fitch Weston, Prince George County, Va., assignor, by mesne assignments, to The Solvay Process Company, New York, N. Y., a corporation of New York No Drawing. Application April 13, 1934, Serial No. 720,436. Renewed September 15, 1937

4 Claims. (Cl. 23—102)

This invention relates to the purification of materials containing nitrites and is especially directed to an improved method for the elimination of nitrites from nitrate products. More particularly the invention relates to the treatment of nitrate solutions containing nitrous acid in order to effect elimination from the solution of the nitrous acid.

In the manufacture of certain salts, and particularly by methods involving the reaction of nitrogen oxides with materials such as sodium carbonate, limestone, and the like, solutions of nitrate are formed that may contain substantial quantities of nitrite which is decomposed into nitrate and nitrous acid upon acidification of the soluton with nitric acid either by addition of nitric acid to the solution or absorption of nitrogen dioxide therein. The nitrous acid may be removed in part by aeration, but such a process is not satisfactory for complete removal of the nitrous acid.

I have now found that if urea is added to a solution which contains nitrous acid, the nitrous acid present may be completely eliminated. Furthermore, the elimination of the nitrous acid may be effected without affecting the nitrate or introducing objectionable reagents or by-products into the solution. The amount of urea necessary for the purification will depend upon whether or not complete removal of the nitrous acid is desired. The reaction of urea and nitrous acid may be expressed by the following equation:

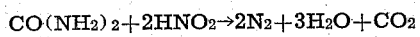

$$CO(NH_2)_2 + 2HNO_2 \rightarrow 2N_2 + 3H_2O + CO_2$$

The stoichiometrical ratio of urea to nitrous acid is thus one mol of urea for each 2 mols of nitrous acid present in the solution. For substantially complete elimination of nitrous acid I add urea to the solution in not substantially less quantity than corresponds to this ratio. The products of reaction, as will be evident, are not injurious and the nitrogen and carbon dioxide are eliminated as gases, the small amount of water formed being the only reaction product retained in the solution. In order to insure complete elimination of the nitrous acid, it may be desirable in some cases to employ slightly more urea than corresponds to the above ratio, say an excess of 10% of the urea; however, ordinarily an excess is not necessary and, if the urea would be objectionable in the product, need not be employed.

The process may be carried out in a continuous or batchwise manner. The time required for the reaction is exceeding short and hence the main factor controlling the time necessary for complete removal of nitrous acid is the efficiency of agitation for securing dissemination of the urea throughout the solution being treated, rather than any limitations in the reaction rate.

While the process of my invention is entirely satisfactory for the removal of any quantities of nitrous acid from acidic solutions, containing for example 0.06 and better 0.2 to 0.4 mol $HNO_3$ per liter, I prefer, when a large proportion of nitrite, either as free acid or a salt, is originally present, to effect removal of a portion thereof prior to the urea treatment. In particular I effect this partial removal by converting the nitrite to free acid if it not already present as such, and then subjecting the acid solution to aeration. In the purification of solutions initially containing only small proportions of nitrous acid, the aeration step is of course unnecessary and it is not essential even with solutions containing relatively large proportions of the nitrous acid. The acidity of the solution is preferably not less than that corresponding to a pH of about 1.2 during the urea treatment.

The following specific examples will serve to illustrate the general applicability of the invention:

*Example 1.*—An aqueous sodium nitrate solution obtained by reaction of aqueous sodium carbonate solution with nitrogen dioxide gas and containing about 400 gms. of $NaNO_3$ per liter, a small amount of nitrous acid and substantial quantities of free nitric acid is aerated to remove a part of the nitrous acid present.

The resultant acidic nitrate solution, which still contains a small proportion of nitrous acid, is passed through a chamber into which a strong aqueous solution of urea (e. g. 80% urea by weight) is continuously introduced in the ratio of about 88 grams of urea solution (containing about 70 grams of urea) for each 100 gms. of nitrous acid present in the nitrate solution. The chamber may be suitably designed to provide intimate contact of urea and nitrous acid by mechanical agitation or otherwise and the solution preferably is treated with the urea at a temperature between about 45° C. and 75° C., for example, at about 70° C. Only a minute or so is required for effecting substantially complete decomposition of the nitrous acid. The treated nitrate solution is continuously withdrawn from the reaction chamber.

The purified solution may be treated in the usual manner, as by neutralization and evaporation, in order to obtain crystalline sodium nitrate.

By the above treatment the nitrous acid is so completely removed that by titration of a 25 cc.

sample of the purified nitrate solution with a N/10 potassium permanganate solution, no nitrous acid was detected. Based upon the recognized sensitivity of this method of determination, the sodium nitrate product obtainable from this solution by neutralization and evaporation as in Example 1, would contain, as a maximum less than .004% of sodium nitrite.

The urea solution employed may be obtained by dissolving solid urea in water. Acidic aqueous sodium nitrate solutions resulting from the reaction of sodium carbonate solution and nitrogen dioxide gas, after the removal of the major portion of the nitrous acid therefrom are ordinarily treated with sodium carbonate to neutralize the nitric acid present. The neutral or slightly alkaline solution is then concentrated in suitable evaporators. In order that the nitric acid present may be completely neutralized, the sodium carbonate is usually introduced in slight excess over stoichiometrical ratio. This results in retention by the solution of carbonate which, with alkali-metals and alkaline-earth-metals either present in the solution or introduced with the sodium carbonate, tends to produce scale in the evaporators in the subsequent concentration step. By addition of ammonia to the nitrate solution while the latter yet contains free nitric acid, ammonium nitrate is produced which upon subsequent heating of the solution in the concentration step, reacts with carbonate or bicarbonate ions present to form carbon dioxide and ammonia and thus prevents the formation of carbonate scale in the evaporators.

Autoclave effluent from the manufacture of urea by reaction of ammonia and carbon dioxide in an autoclave may be used to especial advantage in the purification of an acidic aqueous sodium nitrate solution of the above type. The effluent from the urea synthesis autoclave contains ammonia as well as urea and this effluent when added to the nitrate solution not only destroys nitrous acid present but also produces ammonium nitrate which serves the useful function of inhibiting scale formation in the later concentration step. The urea autoclave effluent also contains small percentages of carbon dioxide but because of the free nitric acid present in the solution, this carbon dioxide is not retained but is harmlessly expelled as a gas. The urea autoclave effluent may be diluted with water or aqueous solution, e. g. nitrate solution when nitrate is to be purified, before mixing with the aqueous solution from which it is desired to eliminate nitrous acid.

The following example illustrates the embodiment of the applicant's invention.

*Example 2.*—An aqueous sodium nitrate solution resulting from reaction of sodium carbonate solution with nitrogen dioxide gas and which nitrate solution contains free nitric and nitrous acids is aerated and then further purified by introducing thereinto and intimately mixing therewith an aqueous urea autoclave effluent (containing between 35% and 50% $(NH_2)_2CO$, between 20% and 50% $NH_3$, between 5% and 30% $CO_2$, and between 10% and 15% $H_2O$) in the ratio of about 140 to 200 grams of the effluent for each 100 grams of nitrous acid present in the solution. The amount of effluent added should be insufficient, however, to neutralize the total free acid contained in the nitrate solution. The resultant aqueous solution is substantially free from nitrous acid and contains in addition to the sodium nitrate, nitric acid and ammonium nitrate. This solution is then treated with sodium carbonate in slight excess over that sufficient to convert nitric acid present to sodium nitrate and is concentrated by heating in evaporators in the usual manner. Carbon dioxide and ammonia pass off from solution leaving the evaporators free from scale. After evaporation has been partially effected, say during the third stage of a three stage evaporation, excess ammonium nitrate present may be reacted upon by means of a basic compound such as sodium hydroxide or sodium carbonate, ammonia and carbon dioxide being expelled during the final concentration.

I claim:

1. The method of removing nitrous acid from a nitrous acid-containing, aqueous sodium nitrate solution, which comprises adding an aqueous ammonia solution containing urea to the nitrate solution while it contains free nitric acid.

2. In the purification of sodium nitrate solution containing nitric and nitrous acids, the step which comprises mixing the solution with a crude aqueous urea autoclave effluent containing between 35% and 50% $(NH_2)_2CO$, between 20% and 50% $NH_3$, and between 5% and 30% $CO_2$.

3. In the purification of sodium nitrate solution containing nitric and nitrous acids, the steps which comprise mixing the solution with urea and ammonia, neutralizing nitric acid present with a slight excess of an alkali-metal carbonate, and concentrating the resultant solution by evaporation.

4. The method of removing nitrous acid from a nitrate solution containing nitrous acid, which comprises adding an aqueous ammonia solution containing urea to the nitrate solution while it contains free nitric acid.

CHARLES FITCH WESTON.